United States Patent [19]

Herz et al.

[11] Patent Number: 4,568,195
[45] Date of Patent: Feb. 4, 1986

[54] MAGNET STIRRING APPARATUS

[76] Inventors: Helmut Herz, Bregenzerstr. 68, 8990 Lindau; Klaus Kaufmann, Schleissheimerstr. 183c, 8000 München 40, both of Fed. Rep. of Germany

[21] Appl. No.: 492,856

[22] Filed: May 9, 1983

Related U.S. Application Data

[62] Division of Ser. No. 320,918, Nov. 10, 1981, abandoned.

[30] Foreign Application Priority Data

Nov. 17, 1980 [DE] Fed. Rep. of Germany ....... 3043335
Mar. 7, 1981 [DE] Fed. Rep. of Germany ... 8106555[U]
Sep. 10, 1981 [DE] Fed. Rep. of Germany ....... 3035961

[51] Int. Cl.$^4$ ............................................. B01F 13/08
[52] U.S. Cl. ..................................................... 366/274
[58] Field of Search ............... 366/144, 241, 273, 274, 366/279, 219

[56] References Cited

U.S. PATENT DOCUMENTS

| 3,304,449 | 2/1967 | Pohlman et al. | 366/273 |
| 3,515,919 | 6/1970 | Houtman | 310/166 |
| 3,680,843 | 8/1972 | Lu et al. | 259/64 |
| 3,693,941 | 9/1972 | Suchy | 259/1 |
| 4,199,265 | 4/1980 | Sanderson et al. | 366/274 |

FOREIGN PATENT DOCUMENTS

| 35762 | 9/1981 | European Pat. Off. |
| 2343501 | 7/1977 | France |
| 1112297 | 5/1968 | United Kingdom |
| 1156206 | 6/1969 | United Kingdom |
| 2063592 | 11/1980 | United Kingdom |

OTHER PUBLICATIONS

International Search Report-European Patent Application No. 81109578.5 Herz, et al.

*Primary Examiner*—Robert W. Jenkins
*Assistant Examiner*—Frankie L. Stinson
*Attorney, Agent, or Firm*—Griffin, Branigan, and Butler

[57] ABSTRACT

In a magnet stirring apparatus comprising a base which includes a plurality of magnet coils and onto which respective vessels can be placed, said vessels being made of a non-magnetic material and each containing a magnetic stirring bar as well as the liquid to be stirred, the stability of the stirring operation within a wide range of lengths of stirring bars and of adjusted rotational speeds is achieved by pole shoes which are long straggling in the radial direction toward one center.

4 Claims, 11 Drawing Figures

MAGNET STIRRING APPARATUS

This application is a division of U.S. Ser. No. 320,918, filed Nov. 10, 1981, now abandoned.

BACKGROUND OF THE INVENTION

This invention relates to a magnet stirring apparatus comprising a base which serves for supporting a vessel containing the liquid to be stirred and a magnetic stirring bar and which contains an electromagnet the poles of which that are located opposite to each other in a plurality of pairs are disposed on the upper side or on the front side of said base, and the exciting windings of which are feedable with current for producing a magnetic field of variable magnitude prevailing at the individual poles.

Such an apparatus is known from German Offenlegungsschrift (German Published Application with documents laid open to public inspection) No. 27 09 365 and, as an electromagnet arrangement, it comprises coils which are opposite to each other in pairs and the magnetic fields of which that are induced by a.c. supply to the coils are, in cooperation, causing the rotation of the stirring bar.

DISCUSSION OF PRIOR ART

The known apparatus has the disadvantage that stable touch-less supporting of the stirring bar within the vessel containing the liquid to be stirred is not always possible during operation, furthermore that, in particular while starting the apparatus, the centering of the stirring bar meets with difficulties, and that especially the range of usable stirring bar lengths is very limited resulting in a limitation of the possibilities of use of the known stirring apparatus.

SUMMARY OF THE INVENTION

One object of this invention is to permit a stable reproducible operation with stirring bars having different lengths and to produce great dynamic effects. This object is achieved by the stirring apparatus according to the invention of the type described in the first paragraph hereinabove wherein the poles of a first pair of poles in top plan view, with respect to a common center, have radially long straggling pole shoes.

The pole of all pairs of poles are suitably provided with pole shoes wherein either only one pair of pole shoes has the aforementioned long straggling shape or again all pairs of pole shoes are formed as long straggling in the radial direction. The pole shoes which are long straggling with respect to the common center in the radial direction may have a substantially sharp pointed triangular or a substantially long straggling tear-shaped form in a top plan view.

It has turned out that this shaping of the pole shoes permits the centering of the stirring bar and a stable operation within a wide speed range and for different lengths of the stirring bars.

Moreover, the shaping of the pole shoes leads to an increase of the achievable dynamic force effect on the stirring bar. This dynamic force can be further enhanced, in accordance with a suitable further development, by connecting the mutually opposite pairs of pole shoes to each other via a common core which is located in said base and is substantially U-shaped in cross-section and on which exciting windings allocated to respective pole shoes are arranged.

The pole shoes with their upper side may be either located flush in a supporting surface of said base or located directly underneath an encapsulation of said base consisting of a non-magnetic material, in particular a synthetic material or stainless steel. In this manner, the present invention simplifies the keeping of the base of the apparatus clean and permits an interference-free mounting of the vessel containing the liquid to be stirred.

According to a very advantageous further development, the pole shoes can be each secured to connecting pieces which are made of a magnetically active material and which extend substantially in the vertical direction relative to the base and are a part of the electromagnet arrangement or which are each extending in angled shape relative to the base which is to be vertically supported. These connecting pieces at their ends remote from the pole shoes are anchored in said base.

The connecting pieces projecting upwards vertically from said base it is possible that a device such as e.g. a nozzle supplying cooling air or a Bunsen burner serving for heating said liquid can be placed between said connecting pieces beneath the vessel supported by the pole shoes and containing the liquid to be stirred.

In the apparatus of the invention it is also possible that the base be composed of a portion containing the exciting windings and parts of a core arrangement coupled thereto and of a portion detachably connected thereto and supporting the pole shoes and the connecting pieces thereof, respectively. Such an embodiment facilitates the fabrication of the apparatus as well as the assembling thereof. In addition, it is possible that portions of different kinds supporting the pole shoes and their connecting pieces respectively be assembled together with a unit comprising the exciting windings and parts of the core arrangement in accordance with the modular construction principle.

The windings of the magnet arrangement in the apparatus of the invention are each excited with square-wave supply voltages so that the windings of poles which are diametrically opposed will obtain a phase-coincident excitation whereas the windings of a pair of poles which is 90° spatially displaced relative thereto will be excited with a square-wave electrically out of phase by 90° relative thereto. This mode of exciting the windings has proved to be very advantageous for achieving a stable operation and for the immediate centering of the magnetic stirring bar when starting service.

It is to be noted that this invention also covers the multiplication of the proposed magnet stirring apparatus to provide stirring plate-like arrangements, which in the case of a synchronous exciting of the magnet arrangements of the individual means comprises further regions which are disposed therebetween and in which a stirring bar located within a vessel containing a liquid is caused to rotate, too.

As already mentioned, the known magnet stirring apparatus sometimes have the disadvantage that the magnetic fields which should come into interaction with the magnetic stirring bar are not sufficiently strong and permit no stable stirring operation so that it may occur that the magnetic stirring bar located in the liquid, during the starting of the excitation of the magnetic coils, will not begin its rotation or will begin its rotation only with considerable delay or will tend to be out of true or will repeatedly run out from the center.

These difficulties can be eliminated basically with further modifications of the magnet stirring apparatus of the invention by a special embodiment of the magnetic circuit which, in particular, comprises pole shoes of a selected shape.

In detail, the aforementioned object is achieved in that the pole shoes of the magnet coils located in the plane of the upper side of said base cover said upper side of the base to such an extent that, between the pole shoes, there are provided comparatively narrow gap spaces. It will be apparent that also hereby in this modification the basical idea is fulfilled, i.e. that the pole shoes should be given a large extending in the radial direction toward a center.

At least the pole shoes can be embedded in a synthetic material or plastic in a manner such that the pole shoe surfaces and the plastic filling of the gap spaces will be in alignment in the base surface. Yet preferably the entire base is cast in a plastic material.

In the case of an arrangement of the magnet coils corresponding to a square raster the outer coil diameter can be a bit less than the diagonal of the pole shoes which are quadratic in a plan top view. It will be apparent that in the case of a quadratic shape of the pole shoes the gap interspaces define quadrat grids the crossing points of which are each those points of the upper side of the base whereonto the vessels together with a magnetic stirring bare can be put for the purpose of stirring the contents thereof. Hence, in a square arrangement along with magnet coils in a quadrat raster arrangement there will result a plurality of stirring locations without it being necessary to provide the quadruple of the stirring location number as the number of magnet coils.

The base can include a yoke arrangement which supports respective iron cores of the magnet coils and which may have the shape of a soft iron plate. Yet the yoke arrangement may also be a soft iron grind interconnecting the foot points of the iron cores of the magnet coils. When, in the case of such an arrangement, the pole shoes have the shape of squares provided with central cutouts in their square sides then the webs or ridges of the soft iron grid extend from one foot point to another footpoint of the iron cores each with respect to a plan view in regions onto which the vertical projection of the pole shoe cuts falls in a manner such that a smaller intensity of the stray fluxes will result and the useful magnetic field above the upper side of the base will be intensified.

In another arrangement of pole shoes and corresponding magnet coils the pole shoes each have substantially the shape of regular trapeziums being parts of equilateral triangles, and the gap spaces between the pole shoes define a regular hexagonal raster while the foot points of the iron cores of the magnet coils are located on the crosspoints of a hexagonal raster which is offset relative thereto and which is on smaller scale.

In this arrangement, three pairs of pole shoes each are disposed around one stirring location or point. Each pole shoe and each associated magnet coil belongs simultaneously to two stirring points. Hence it follow that also in the case of the aforedescribed arrangement a predetermined number of stirring points, each containing six pole shoes, can be achieved in that a smaller number of pole shoes than the sextuple of the number of stirring points is provided.

A further improvement of the centering behaviour and of the stability of the position of the stirring bar during operation is achieved also in the case of greatly differing stirring bar lengths in that the pole shoes, radially long straggling with respect to a common center, are upwardly cranked from their respective connecting point to the magnet coil poles in a manner such that radially inner pole shoe sections are located substantially in one plane with the supporting base surface for the vessels or directly thereunder, while the pole shoe sections connected to the magnet coil poles are located a greater distance from the plane of the supporting base surface beneath the same.

In this manner it is achieved that the stray fields which start off from the magnet coil poles and which have a comparatively higher intensity, will exert an influence of a smaller extent upon the stirring bar ends. In the case of the apparatus proposed here it has been taken care that the magnet coil poles are lowered relative to the supporting surface of the base whereas the radially inner pole shoes sections produce a central rotary field which has a high intensity and which comes into interaction with the stirring bar and centers the stirring bar.

It will be understood that the ideas stated here are also applicable to magnet stirring apparatus which are provides with a plurality of stirring points, wherein groups or sets of pole shoes each define one stirring location or point and surround the same and wherein predetermined pole shoes of a stirring location may each simultaneously also belong to other stirring locations. This means that the pole shoes are grouped for example in a quadrat or square raster or in a hexagonal raster the crossing points of which are each constituting the respective stirring locations.

An increase of the stirring forces and a stable operation when using smaller stirring bars can also be achieved according to an important feature of the system proposed here by filler pieces which are made of a magnetically active material and which are disposed between the pole shoes without being themselves connected to the magnet coil poles.

This invention does moreover cover also the use of the proposed magnet stirring apparatus for household purposes.

BRIEF DESCRIPTION OF THE DRAWINGS

A number of exemplary embodiments will be described in greater detail hereinafter with reference to the drawing in which.

DETAILED DESCRIPTION OF PREFERRED EMBODIMENTS

Figure 1:
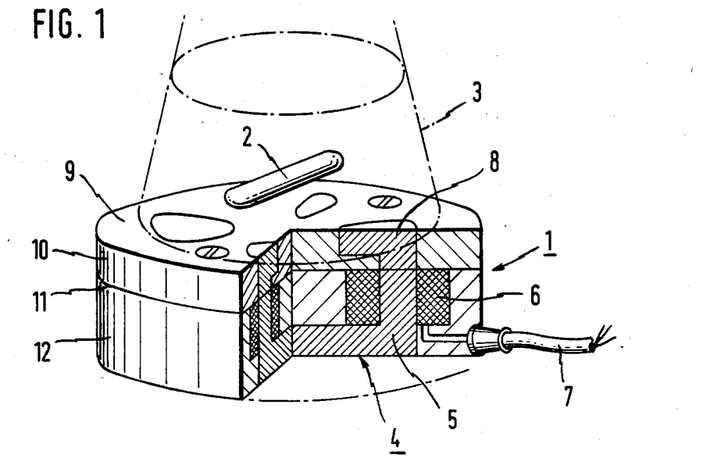
FIG. 1 shows a partially sectional perspective vies of a magnet stirring apparatus.

In FIG. 1 a substantially circular disc-shaped base of the stirring apparatus is designated by 1. The stirring bar 2 which has a magnetic momentum and may be formed for example of a magnetic bar covered with a jacket of synthetic plastics material, is located within a vessel 3 which is shown by dot-and-dash lines in FIG. 1 and which is put on the upper side of the base 1.

Within said base 1 there is enclosed an electromagnet arrangement which contains a core 4 together with four vertical legs 5 and exciting windings 6 each surrounding these legs and which is fed pulsewise or continuously with current via electrical leads 7 in a manner such that, at the individual poles associated with respective exciting windings 6, magnetic fields are induced which have alternate magnitudes and which overlap each other on the upper side of the base 1 so that the stirring bar 2 within the vessel 3 is caused to rotate.

The vertical legs 5, at their upper ends, each merge into respective pole shoes 8 which, in a top plan view, have a long straggling ovoid shape, long straggling tear-like shape or a sharpe-pointed triangular shape. The narrow or sharp-pointed ends of the pole shoes are pointing toward a common center.

The upper sides of the pole shoes 8 are located as being in alignment in the upward pointing surface 9 of a flat disc-shaped portion or section 10 of the base 1, said section 10 being adjacent a lower section 12 of the base via an interface 11. The interface 11 extends throughout the entire arrangement inclusive of the vertical legs 5 of the electromagnet arrangement in a manner such that the base sections 10 and 12 can be clamped together.

Figure 2:
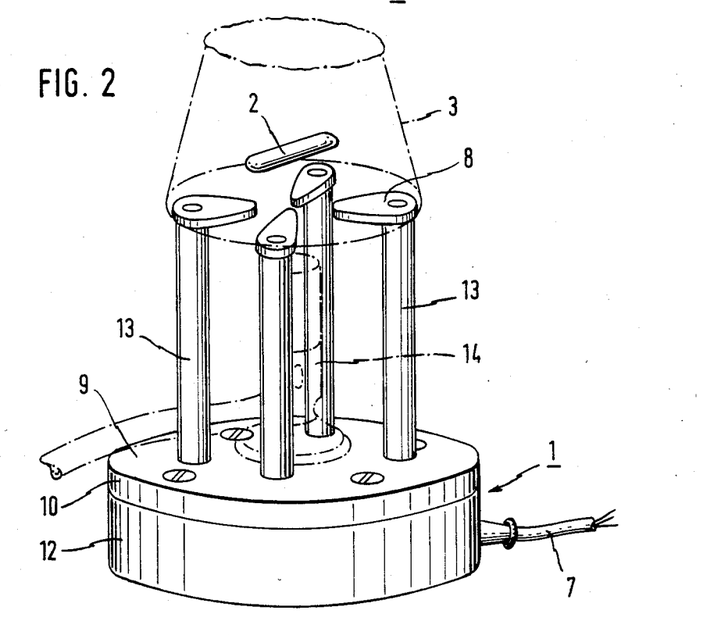
FIG. 2 shows a perspective view of a magnet stirring apparatus modified relative to FIG. 1.

Whereas in the exemplary embodiment according to FIG. 1 the pole shoes 8 constitute a part of section 10 of said base 1, the pole shoes 8, in the embodiment according to FIG. 2, are secured to the upper ends of connecting pieces 13 which are made of a magnetically active material and which have their lower ends anchored in section 10 of the base and abut the upper ends of the vertical legs 5 of core 4 of the magnet assembly. Hence the connecting pieces 13 represent extensions of the magnetic circuits in a manner such that a vessel 3 containing a liquid and the stirring bar 2 can be supported at a predetermined height above the upper side 9 of base 1. The support of the vessel takes place by the pole shoes 8 alone or in coaction with additional holding and supporting means.

FIG. 2 shows that a Bunsen burner 14 can be placed in between the connecting pieces 13 and on base 1, said burner serving for heating the contents of vessel 3 during the stirring by means of the stirring bar 2.

Figure 3:
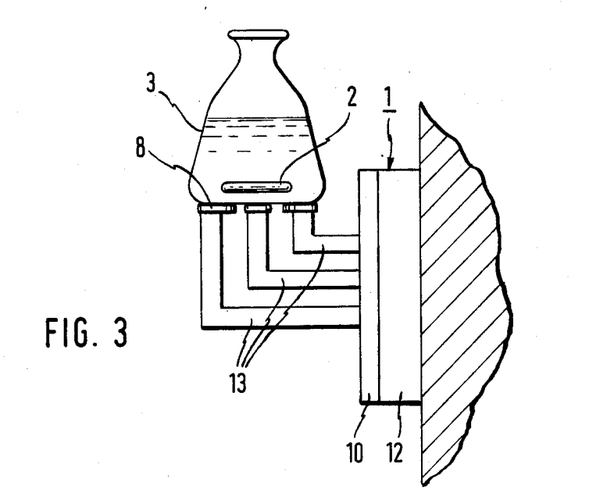
FIG. 3 shows a side view of another modified embodiment.

If the magnet stirring apparatus is to be suspended on a vertical wall or if the apparatus, with its base, is to be vertically supported, the connecting pieces 13 according to the exemplary embodiment shown in FIG. 3, can be each formed also as angled or bent and anchored by a horizontal section in the vertically standing base 1 or respectively in section 10 of the latter. In general, the length of the connecting pieces 13 which in this case is respectively different, is magnetically irrelevant because of the dissimilarly higher magnetic resistance of the gap space between the pole shoes 8 and the stirring bar 2. Yet in certain cases it may be suitable that the differing lengths of the connecting pieces 13 should be balanced by selection of a correspondingly different cross-section for the purpose of equalizing the magnetic closing circuits.

It is to be noted that the arrangement of the connecting pieces 13 between a base containing the electromagnet arrangement and the pole shoes represents a significant idea independently of the shaping of the pole shoes.

Figure 4:
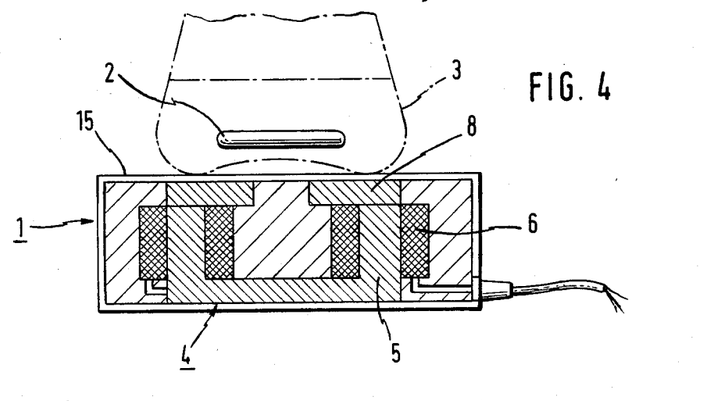
FIG. 4 shows a section through another modified embodement of a magnet stirring apparatus.

The embodiment according to FIG. 4 is similar to that according to FIG. 1. However, the upper sides of the pole shoes 8 are not located freely ar the upper side 9 of base 1 but are disposed directly underneath an encapsulation 15 of base 1, which encapsulation may be made of a synthetic material such as e.g. tetrafluorethylene, or from a nonmagnetic stainless steel. In any case, the encapsulation 15 is selected with respect to its strength and with respect to the material used in such manner that the formation of the magnetic field influencing the stirring bar 2 is not substantially impaired. Besides, the arrangement may be such that the electromagnet arrangement as well as the pole shoes 8 upon a preparatory mounting assembly, can be cast within the base 1 in a synthetic material.

Figure 5:
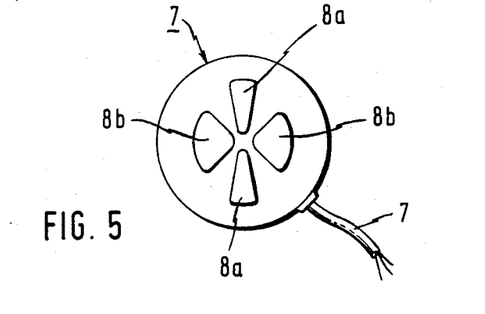
FIG. 5 shows a top plan view of a stirring apparatus comprising another modified arrangement of the poles and pole shoes, respectively.

The magnet stirring apparatus shown in a top plan view in FIG. 5, while otherwise being a similar embodiment as the devices according to FIGS. 1 and 4, has respective differing pairs of mutually opposite pole shoes. The pole shoe pair 8a in its shape corresponds to the shape of the pole shoes 8 of the previously described embodiments. The pole shoe pair 8b which is spatially offset in relation thereto by 90°, has in top plan view the shape of comparatively broad circular sector configurations. The feeding of the exciting windings associated with the pole shoe pairs 8a and 8b, respectively, takes plAce by square-wave supply voltages having a frequency corresponding to the desired rotational speed of the stirring bar along with a mutual phase shift corresponding to the spatial displacement of the pole shoes pairs, in the present case—with a phase displacement of 90°. A similar supply of the exciting windings is provided also for the previously described embodiments.

Figure 6:
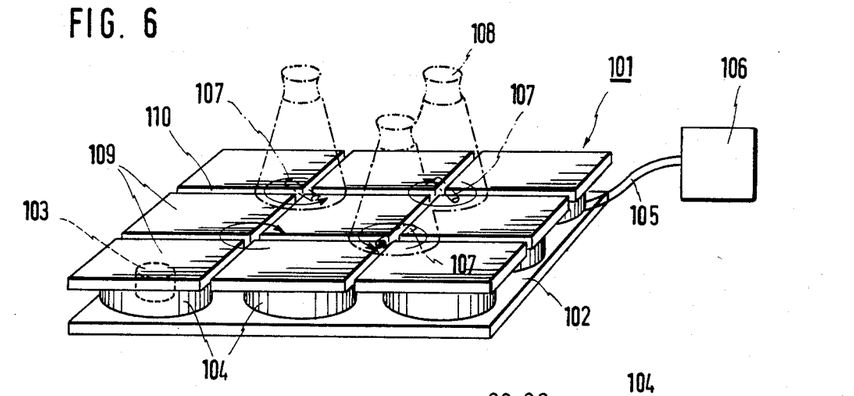
FIG. 6 shows a schematic perspective view of a magnet stirring aparatus having a flat plate-shaped base and a plurality of stirring locations or points each formed of one group or set of four pole shoes.

The magnet stirring apparatus according to FIG. 6 has a flat plate-shaped base 101 which is built-on upon a yoke arrangement 102 in the shape of a soft iron plate. As shown in the left-hand portion of the depiction in FIG. 6, iron cores 103 surrounded by flat disc-shaped magnet coils 104 are projecting from the soft iron plate 102 at points defined by a quadrat or square raster. The magnet coils are connected via connecting leads 105 to a current source 106 permitting the supply to the magnet coils with currents which are phase shifted relative to each other so that, above the magnet coils, in a layer parallel to base 101, there are created magnetic rotary fields which come into interaction with a magnetic stirring bar 101 located within a respective vessel 108 which contains the liquid to be stirred and which is put on the upper side of the base. The mode and manner of controlling the current impingement for producing suitable magnetic rotary fields do not constitute subject matter of the invention and are known to those skilled in the art. However, it is to be noted here that the magnet stirring apparatus may have a base 101 each time including more than two series or rows and more than two columns of coils, as shown in FIG. 6. The principles of this arrangement will be described in greater detail hereinafter.

Figure 7:
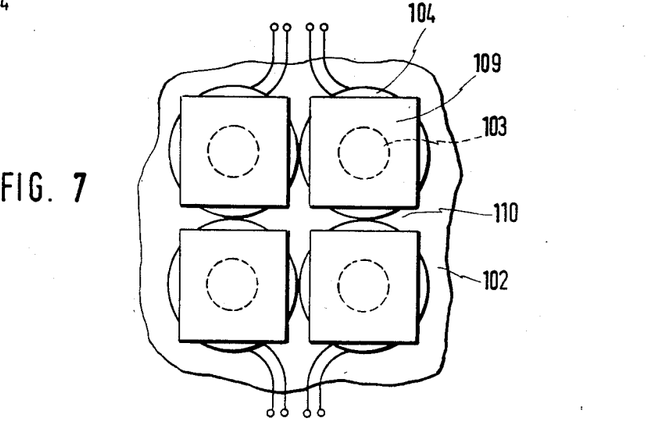
FIG. 7 shows a section from a magnet stirring apparatus in plan top view with four magnet coils and associated pole shoes.

On the end face areas of the magnet coils 104 there are provided pole shoes 109 which are secured to the upper ends of the iron cores 103 and which, in the embodiment according to FIGS. 6 and 7, have square shape in top plan view and which are separated from each other by gap spaces 110. The gap spaces define a quadrat or square raster the crossing points of which represent stirring locations for putting-on of vessels 108 along with magnetic stirring bars 107 disposed therewithin. From FIG. 6 one may readily see that by means of a comparatively smaller number of magnet coils 104 and associated pole shoes 105 a relatively greater number of stirring locations can be obtained because a predetermined pole shoe can belong to several adjacent pole shoe systems, simultaneously.

Whereas in accordance with the embodiment according to FIG. 7 the gap spaces 110 are freely located between the pole shoes 109 so that the magnet coils 104 located underneath the pole shoes are visible, the base 101 according to FIG. 6, within the region of the upper side of the base, is cast-in with synthetic material so that the gap spaces 110 between the pole shoes 109 are filled up with synthetic material. However, the entire base 101 can also be totally cast with synthetic material so that the pole shoes 109 are embedded in the synthetic material on the upper side of the base.

As shown in FIG. 7, the pole shoes 109 are dimensioned so that they have a diagonal dimension which is slightly larger than the diameter of the coils 104. In this manner it is avoided that, by reason of excessive extending of the pole shoes over the coils inadmissibly great magnetic stray fluxes towards the yoke arrangement 102 would be created.

Figure 8:
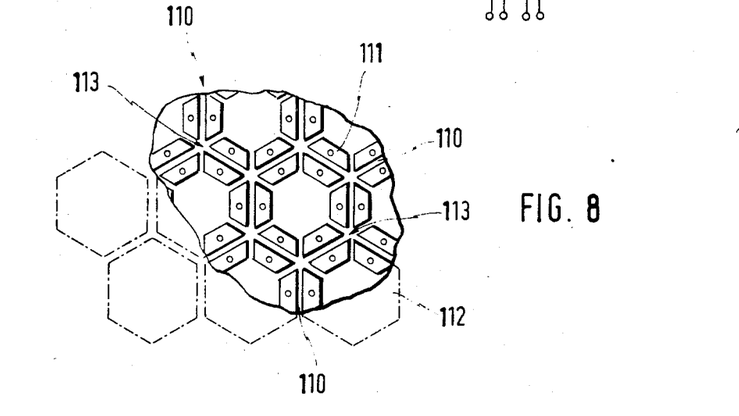
FIG. 8 shows a greatly schematic view of a magnet stirring apparatus having a plurality of trapezium-shaped pole in a hexagonal raster arrangement.

A greater number of stirring locations on the base of a magnet stirring apparatus can be realized not only by a line an column arrangement of rectangular and in particular square pole shoes 109 but also by a plurality of equilateral triangular or of trapezium-shaped pole shoes, as shown in FIG. 8. Hence the magnet arrangements each formed of four magnet coils 104 and four associated pole shoes 109 for producing a magnetic rotary field in the layer space above the upper side of the base, in the embodiments according to FIGS. 6 and 7 comprises two pole pairs in the shape of the pole shoes which are diagonally opposite each other via a respective crossing or intersection point of the gap spaces 110, whereas, in the embodiment according to FIG. 8, three pole pairs each are provided which are each producing such a magnetic rotary field upon a correspondingly phase shifted excitation of the magnet coils. In FIG. 8 the individual pole shoes are designated with 111 and have the shape of regular trapeziums the long sides of which are aligned along a hexagonal pattern, as shown in FIG. 8 at 112 by dot-and-dash lines. Underneath the pole shoes 111 are located respective magnet coils which, however, are not depicted in FIG. 8 for the sake of simplification of the drawing.

The stirring locations which again are located at the points of intersection of the gap spaces 110 are specified by reference numeral 113 in FIG. 8. They are located at the branching points of the hexagonal pattern 112 and, as stated are formed of the points of intersection of the gap spaces 110.

It will be apparent that, when the trapezium-shaped pole shoes 111 in a top plan view, are a part of an equilateral triangle then the hexagonal pattern 112 will have a regular shape whereas, if the trapezium-shaped pole shoes 111 are parts of isosceles triangles which have different vertex angles to be determined according to simple geometrical calculations then the hexagonal pattern 112 can be stretched in one or the other direction, which may be desirable in certain cases. It is also to the magnet stirring apparatus according to FIG. 8 that the rule applies that, on the basis of the fact that each pole shoe belongs to two stirring locations 113, it is possible to provide a greater number of stirring locations than it follows from a division of the number of the utilized pole shoes by six.

Figure 9:
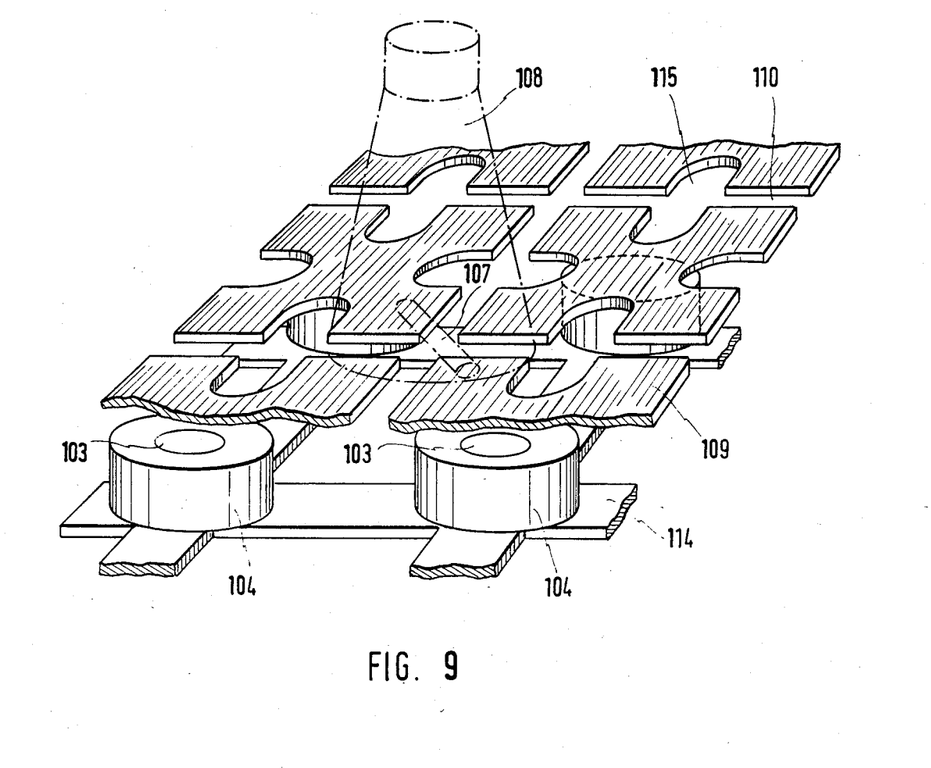
FIG. 9 shows a schematic perspective partial view of the plate-shaped base of a magnet stirring apparatus in an embodiment modified with respect to FIG. 6.

The embodiment according to FIG. 9 differs from that according to FIG. 6 first of all in that in lieu of the yoke arrangement 102 in the configuration of a soft iron plate now, in the embodiment according to FIG. 9, there is used a grid arrangement 114 the grid rods of which extend in the manner of a square raster or rectangular raster between the foot points of the iron cores 103 of the magnet coils.

Furthermore, the pole shoes 109 having square or quadratic outline are provied with radial recesses or cutouts in the midpoint of their quadrat or square sides in a manner such that such cutouts designated by 115 in FIG. 9 are opposite each other across the gap spaces 110 between the pole shoes 109. The clearance space defined by each pair of cutouts 115 has a length such that the vertical projection thereof falls upon a respective one of the legs of the grid 114 whereby the generation of stray fluxes between the pole shoes 109 and the grid 114 and thus a decrease of the magnetic field above the upper surface of the base is avoided.

It is to be noted again that the arrangements shown can be greatly extended and multiplied so that magnet stirring apparatus having a plurality of stirring locations can be provided. By virtue of the pole shoes having large areas and located opposite each other only across gap spaces the stable operational behaviour of the apparatus is considerably improved.

Figure 10:
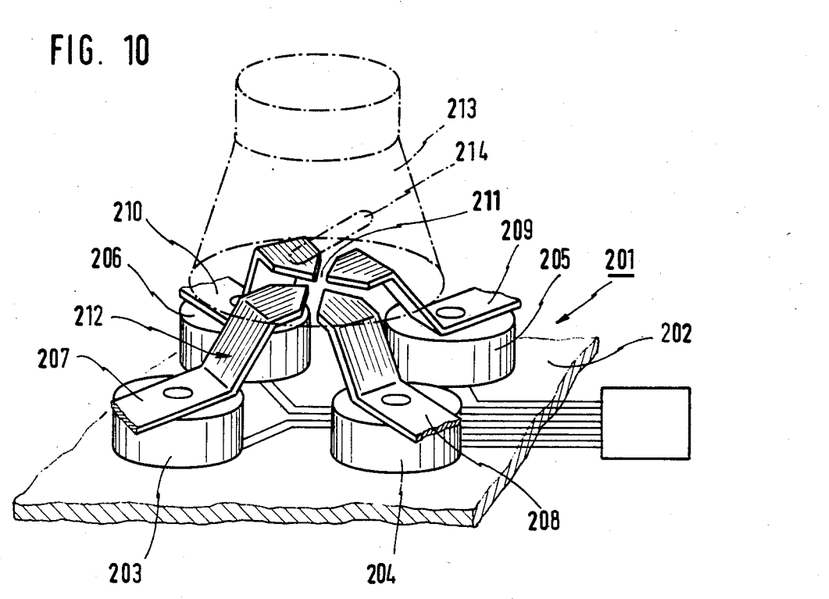
FIG. 10 shows a perspective schematic view of a magnet stirring apparatus in section wherein some housing parts are omitted.

The magnet stirring apparatus shown in FIG. 10 has a base 201 which is contained in a housing (not shown in the drawing) and which, for example, can be cast in casting resin (not shown, either). The base has a yoke plate 202 upon which the magnet coils 203, 204, 205 and 206 are mounted. The cores of the magnet coils 203 through 206 are secured to the yoke plate 202 at one side and have connection to pole shoes 207, 208, 209, 210, respectively, at the other side, which latter pole shoes are long straggling radially with respect to a common center or respectively to the center 211 of the upper base surface concerned. The pole shoes 207 through 210 are formed as cranked from their respective point of connection to the magnet coil poles onward and they are upwardly cranked, as shown at 212 in FIG. 10. Accordingly, the radially inner pole shoe sections are located substantially in one plane with the base surface for placing onto a vessel 213 which is depicted by dot-and-dash lines and which has a stirring bar 214 disposed therewithin, while the pole shoe sections connected to the magnet coil poles, i.e. the radially outer pole shoe portions, are located at a greater vertical distance underneath the said base surface.

As shown in FIG. 10, the pole shoes, within the region of their radially inner ends, have a wedge-like shape so that only comparatively narrow interspaces are provided between the pole shoes.

Figure 11:
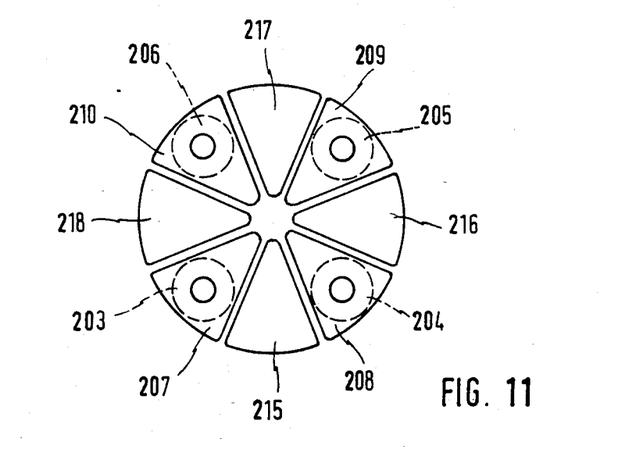
FIG. 11 shows a top plan view of a pole shoe arrangement including intermediate-mounted or interposed filling pieces according to another embodiment.

The pole arrangement shown in a top plan view in FIG. 11, similar to the embodiment according to FIG. 10, comprises two pairs of mutually opposite pole shoes 207 through 210. In the embodiment according to FIG. 11 the pole shoes have a subtantially disk sector shaped configuration. As shown in FIG. 11 with respect to a top plan view, the intermediate spaces between the pole shoes comprise filling pieces 215, 216, 217 and 218 which are formed of a magnetically active material and which fill up said intermediate spaces except narrow gap spaces.

The filling pieces have the same shape as the pole shoes and, in the embodiment according to FIG. 11, they are located in one plane with these pole shoes. Yet in certain cases it is advantageous that the filling pieces 215 through 218 should be placed slightly deeper relative to the plane of the pole shoes 207 through 210. If the pole shoes 207 through 210 of the embodiment according to FIG. 11 have an upward offset bend as was described in connection with FIG. 10, it may be suitable for example to arrange the filling pieces 215 through 218 in the plane of those pole shoe sections which are connected to the magnet coil poles.

It will be apparent that the filling pieces 215 through 218 enhance the stability of operation at low rotational speeds and permit a higher stirring force.

Finally, it is to be noted that the embodiments according to FIGS. 10 and 11 are shown in a schematical form. The excitation of the magnet coils 203 through 206 by a current source shown as a block symbol in FIG. 10 takes place in a manner such that, in the upper surface of the base 201, a magnetic rotary field with a vector rotating in the plane of said base surface is produced in a manner known per se. In the case that further groups or sets of magnet coils and pole shoes are provided whereby, similtaneously, predetermined magnet coils and predetermined pole shoes can belong in common to a plurality of groups, a corresponding enlargement of the base will result in several stirring locations for the simultaneous operation of a plurality of stirring bars within a corresponding number of vessels. For that very reason, in FIG. 10 the yoke plate 202 and the radially outer ends of the pole shoes are shown as broken off or cut off, respectively.

What is claimed is:

1. A magnetic stirring apparatus comprising:
   a base for supporting a vessel containing a magnetic stirring bar and liquid to be stirred;
   electromagnet means having: poles located opposite each other in a plurality of pairs; exciting coils; and, means for feeding current to said exciting coils for producing a magnetic field of variable magnitude at the individual poles;
   a plurality of pairs of pole shoes, each pole shoe having first and second pole shoe ends and an intermediate portion wherein each first pole shoe end is connected to a corresponding pole located in a first plane; and, each intermediate portion extends radially, inwardly and upwardly from its associated first pole shoe end to its associated second pole shoe end;
   each of said second pole shoe ends being separated from adjacent pole shoe ends by a narrow gap and located in a plane above the plane of its associated first pole shoe end;
   said pole shoes thereby extending radially inwardly from said poles and toward a common center so that all of said second pole shoe ends are located in substantially the same plane as the upper side of said base.

2. The magnetic stirring apparatus of claim 1 including magnetically-active filling pieces located in the narrow gaps between said second pole shoe ends in the same plane as the upper side of said base.

3. A magnetic stirring apparatus comprising:
   a base for supporting a plurality of vessels, each containing a magnetic stirring bar and a liquid to be stirred;
   electromagnet means having: poles located opposite each other in a plurality of pairs; exciting coils; and, means for feeding current to said exciting coils for producing a magnetic field of variable magnitude at each of said individual poles;
   a plurality of pairs of pole shoes, each pole shoe having a pole-shoe-connecting portion, a pole shoe end, and an intermediate portion wherein each pole-shoe-connecting portion is connected to a corresponding pole located in a first plane; and, each intermediate portion extends radially, inwardly and upwardly from its associated pole-shoe-connecting portion to its associated pole shoe end;
   each of said pole shoe ends being separated from adjacent pole shoe ends by a narrow gap and located in a plane above the plane of its associated pole-shoe-connecting portion;
   said pole shoes extending radially inwardly from said poles toward common centers so that all of said pole shoe ends are located in substantially the same plane as the upper side of said base; and,
   wherein, the electromagnet means and the corresponding poles are further arranged in groups of said electromagnet means and groups of said poles so that a plurality of stirring locations are provided on the upper side of said base for stirring operations in a plurality of supported vessels.

4. The magnetic stirring apparatus of claim 51 including magnetically-active filling pieces located in the narrow gaps between said pole shoe ends in the same plane as the upper side of said base.

* * * * *